J. A. DAHNE.
SCALE.
APPLICATION FILED MAR. 14, 1919.
1,345,587.
Patented July 6, 1920.
2 SHEETS—SHEET 1.
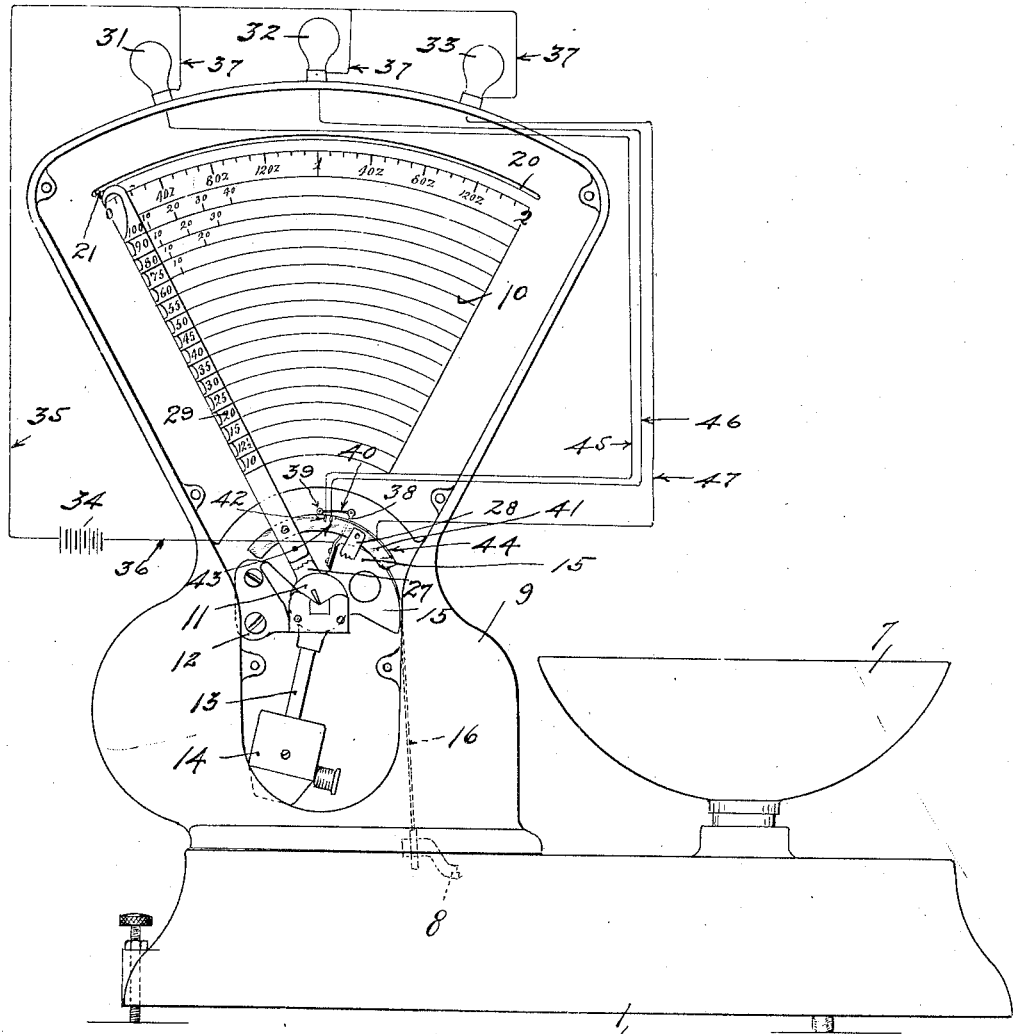
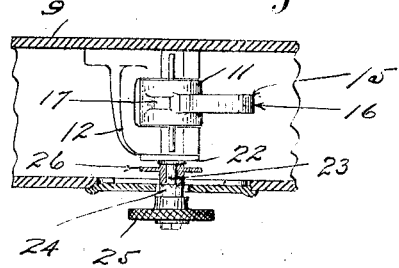
Inventor.
Julius A. Dahne
By his Attorneys.
Williamson Merchant J. A. DAHNE.
SCALE.
APPLICATION FILED MAR. 14, 1919.
1,345,587.
Patented July 6, 1920.
2 SHEETS—SHEET 2.
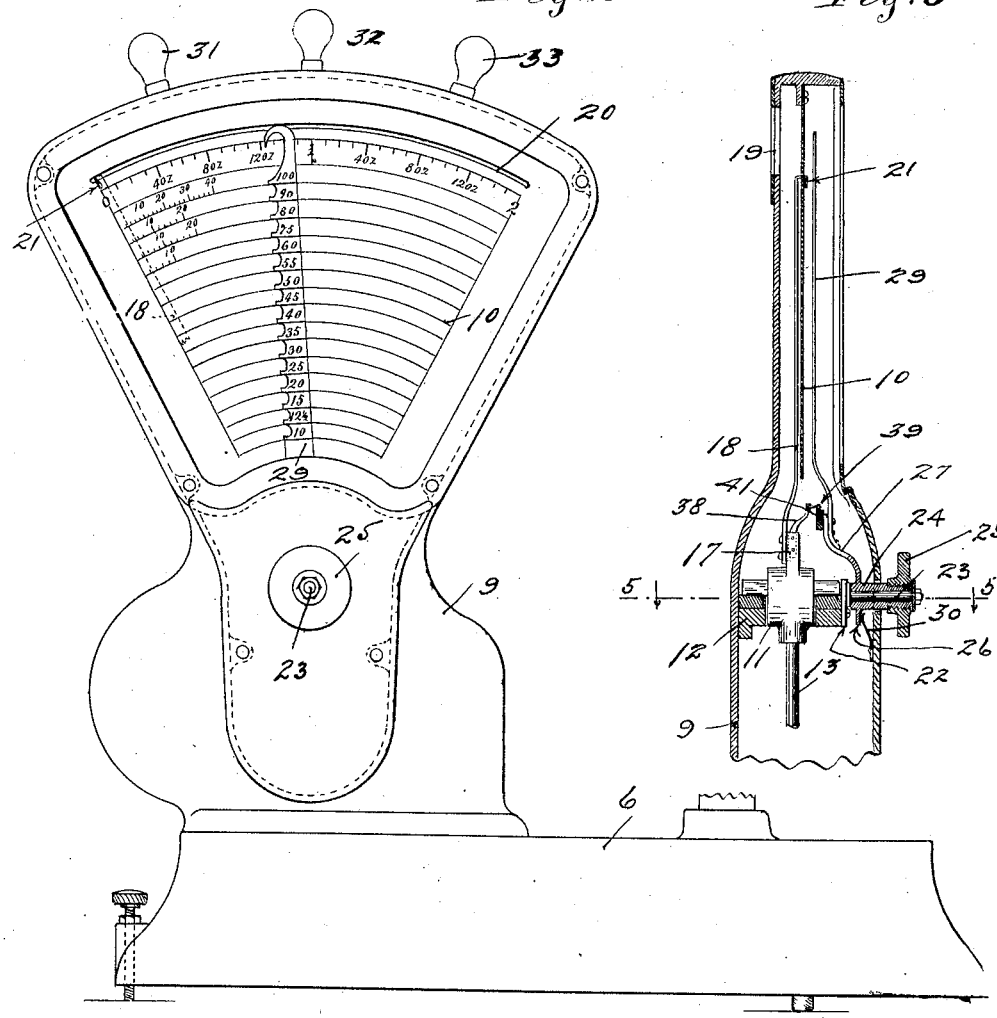
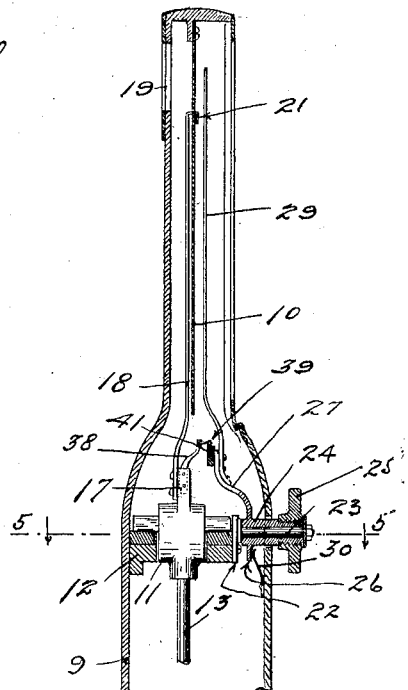
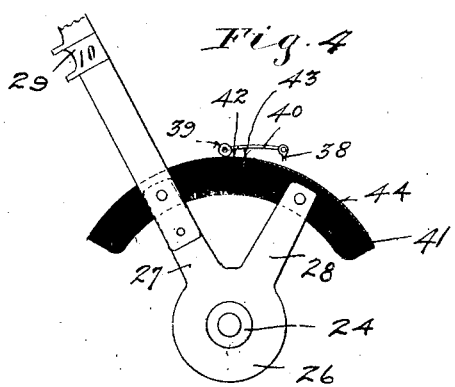

UNITED STATES PATENT OFFICE.

JULIUS A. DAHNE, OF STILLWATER, MINNESOTA.

SCALE.

1,345,587. Specification of Letters Patent. Patented July 6, 1920.

Application filed March 14, 1919. Serial No. 282,616.

*To all whom it may concern:*

Be it known that I, JULIUS A. DAHNE, a citizen of the United States, residing at Stillwater, in the county of Washington and State of Minnesota, have invented certain new and useful Improvements in Scales; and I do hereby declare the following to be a full, clear, and exact description of the invention, such as will enable others skilled in the art to which it appertains to make and use the same.

My invention relates to improvements in computing weighing scales, and has for its object to provide means for indicating a predetermined weight in advance of the weighing action of the scale, together with signals arranged to be successively and automatically operated to indicate under weight, correct weight and over weight, under the weighing action of the scales, and in respect to said weight indicating means.

To the above end, the invention consists of the novel devices and combinations of devices hereinafter described and defined in the claims.

In the accompanying drawings, which illustrate the invention, like characters indicate like parts throughout the several views.

Referring to the drawings,

Figure 1 is a view in front elevation of a computing weighing scale, with some parts removed, and having the invention incorporated therein, said view also diagrammatically illustrating the electric circuit for the visual indicators;

Fig. 2 is also a front elevation of said scale with some parts broken away and having some parts set in different positions from those shown in Fig. 1;

Fig. 3 is a view principally in central vertical section with some parts broken away;

Fig. 4 is a fragmentary detail view, on an enlarged scale; and

Fig. 5 is a detail view with some parts shown in a horizontal section in the vicinity of the bearings for the hand.

Of the standard parts of the computing scale illustrated, it is important to note the base 6, scoop 7 supported by the beam 8, casing 9, secured to the base 6, combined weight and price indicating dial 10 suspended from the top of the casing 9, rock shaft 11 having knife-edged bearings engageable with a bracket 12 supported from the back of the casing 9, depending stem 13 rigidly secured to the shaft 11 and carrying a pendulum-acting weight 14, an upwardly projecting segment 15 integrally formed with the shaft 11 and inclined in the direction of the movement of the attached hand of the scale under the weighing action thereof, and a strap 16 anchored at its upper end to the uppermost portion of the segment 15 and attached at its lower end to the beam 8 with its intermediate portion extending over the periphery of said segment. Also integrally formed with the shaft 11, is a short arm 17 in diverging relation to the segment 15. This arm 17 customarily carries a combined weight and price indicating hand arranged to move over the face of the dial 10, under the weighing action of the scale.

In place of the customary combined weight and price indicating hand, I secure to the arm 17 a weight-indicating arm 18 arranged to move over the back of the dial 10 on which will be marked weight-indicating graduations. These graduations, which it is not necessary to illustrate, as they correspond to the weight graduations on the front of the dial 10, may be plainly seen by a customer through a sight opening 19 in the back of the casing 9. To permit a clerk or other person to watch the movement of the hand 18 from the front of the scale, the free end portion thereof is bent laterally and extended through a segmental slot 20 in the dial 10 and provided with a depending pointer 21 arranged to move over the weight-indicating graduations on the face of said dial.

Rigidly secured to the bracket 13, is a plate 22 which, in turn, has rigidly secured thereto a fixed stud 23 which projects horizontally through an aperture in the face of the casing 9. Loosely mounted on the stud 23, is a sleeve 24 which also projects through the aperture in the face of the casing 9 and has fixed on its outer end a thumb wheel or knob 25, by which said sleeve may be turned on the stud 23. Integrally formed with the inner end of the sleeve 24, is a concentric annular flange 26 from which upwardly projects two radial arms 27 and 28.

A combined weight and price indicating hand 29 is rigidly secured to the arm 27 and frictionally held in different set positions by a screw 30 secured to the casing 9 and yieldingly pressing against the flange 26. Obviously, by turning the knob 25, the hand 29 may be manually set in different adjustments, in respect to the dial 10, to indicate a predetermined weight of a load to be weighed on the scale in advance of the weighing action of the scale.

Automatically operated signals, as shown, visual indicators are provided for indicating whether the load on the scale is over, correct, or under weight, in respect to the predetermined weight as indicated by the hand 29. As shown, these indicators are in the form of three electric light bulbs 31, 32 and 33, preferably colored red, white and blue, respectively. These bulbs 31, 32 and 33, as shown are mounted on the top of the casing 9 and arranged from the left to the right, respectively. In actual construction, a cover or housing, not shown, will be provided for the white bulb 32 and arranged to cause said bulb to flood the face of the scale when said white bulb is lighted. A battery 34 is provided as a source of electrical energy for the bulbs 31, 32 and 33 and connected to said battery are wires 35 and 36. Branch wires 37 electrically connect the bulbs 31, 32 and 33 to the wire 35, and the wire 36 is electrically connected to a small bracket 38 secured to the segment 15 and insulated therefrom.

Carried by the bracket 38, is a movable contact 39 in the form of a small roller journaled on an arm 40 pivoted to said bracket. This contact 39 gravity rests on the periphery of a segment 41 of suitable insulating material and carried by the arms 27 and 28. Set into the periphery of the segment 41 and circumferentially spaced with respect to each other, are three fixed contacts 42, 43 and 44 arranged from the left to the right respectively. The contacts 42 and 43 are relatively short and the contact 44 is relatively long, as best shown in Fig. 4. A wire 45 electrically connects the red bulb 31 to the contact 42, a wire 46 electrically connects the white bulb 32 to the contact 43 and a wire 47 electrically connects blue bulb 33 to the contact 44. It may be here stated that the red bulb 31, when lighted indicates under weight, the white bulb 32, when lighted, indicates correct weight, and the blue bulb 33, when lighted, indicates over weight.

Normally both of the hands 18 and 29 are in their extreme left-hand positions and at zero, with respect to the dial, as shown in Fig. 1. The electric circuit is normally broken by the movable contact 39 which rests on the insulating segment 41 at the left of the contacts 42, 43 and 44. When the improved scales are to be used, the hand 29 is manually moved by turning the knob 25 to set said hand, in respect to the dial 10, to indicate the predetermined weight. As shown in Fig. 2, the hand 29 is set to indicate a weight slightly over twelve ounces. This movement of the hand 29, in respect to the dial 10, carries the fixed contacts 42, 43 and 44 a proportional distance from the movable contact 39, when the hand 18 is at zero, relative to the predetermined weight indicated by the hand 29.

Materials to be weighed are poured or placed in scale scoop 7, and, under the action of the beam 8 on the strap connection 16 to the segment 15 the shaft 11, is rocked on its knife-edge bearings and thereby draws the movable contact 39, carried by said segment to the right over the periphery of the segment 41. Under the increasing load placed on the scales, the contact 39 first comes into engagement with the contact 42, completes the electrical circuit through the red bulb 31, and lights the same, which indicates under weight. By further increasing the load on the scale, the contact 39 moves out of engagement with the contact 42 and into engagement with the contact 43, thereby breaking the circuit to the red bulb and completing the circuit to the white bulb 32, indicating correct weight. If too much of a load is placed on the scales, the contact 39 will move out of engagement with the contact 43 and into engagement with the contact 44, thus breaking the circuit to the white bulb 32 and completing the circuit to the blue bulb 33, indicating over weight. It will then, of course, be necessary to remove a portion of the load to cause the contact 39 to move out of engagement with the contact 44 and into engagement with the contact 43, thus breaking the circuit to the blue bulb 33 and completing the circuit to the white bulb 32, which again indicates correct weight. As long as there is an overweight on the scales the circuit to the blue bulb will remain complete.

By the use of the automatically controlled visual indicators a customer may watch the scale from a distant point to see whether or not he is given the correct weight. Also the proprietor or manager of a store may readily see whether or not his clerks are giving correct weight. The tendency of clerks, either from carelessness or when in a hurry, is to give over weight, which of course, often means the difference between success and failure.

What I claim is:

1. The combination with a weighing scale having a dial, of a hand coöperating with the dial and arranged to be set in different weight indicating adjustments in advance of the weighing action of the scale, a plurality of visual weight indicators, and automatic means for including said hand for successively operating said indicators under the weighing action of the scale and in respect to the weight indicated by said hand.

2. The combination with a weighing scale having a dial, of a hand coöperating with the dial and arranged to be set in different weight indicating adjustments in advance of the weighing action of the scale, three visual indicators representing under weight, correct weight, and over weight in respect to the weight indicated by said hand, and automatic means including said hand for successively operating said indicators under the weighing action of the scale.

3. The combination with a weighing scale having a dial, of a hand coöperating with the dial and arranged to be set in different weight indicating adjustments in advance of the weighing action of the scale, three electric light bulbs representing under weight, correct weight, and over weight, in respect to the weight indicated by said hand, three fixed contacts simultaneously adjustable with the hand, a coöperating movable contact operated by the mechanism of the scale under the weighing action thereof, and a normally open electric circuit including said contacts for successively lighting said bulbs under the weighing action of the scale and in respect to the weight indicated by said hand.

In testimony whereof I affix my signature in presence of two witnesses.

JULIUS A. DAHNE.

Witnesses:
W. G. COVY,
ARTHUR JAMISON.